United States Patent [19]

Tochioka

[11] Patent Number: 6,048,948
[45] Date of Patent: *Apr. 11, 2000

[54] METHOD FOR PRODUCING A POLYMER COMPOSITE MATERIAL

[75] Inventor: Takahiro Tochioka, Higashihiroshima, Japan

[73] Assignee: Mazda Motor Corporation, Hiroshima-ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/934,112

[22] Filed: Sep. 19, 1997

Related U.S. Application Data

[63] Continuation of application No. 08/528,633, Sep. 7, 1995, abandoned.

[30] Foreign Application Priority Data

Sep. 7, 1994 [JP] Japan .................................. 6-214041

[51] Int. Cl.$^7$ ............................ C08L 67/02; C08L 69/00; C08L 77/00; C08L 81/00
[52] U.S. Cl. ......................... 525/425; 525/420; 525/432; 525/433; 525/437; 525/439; 525/444; 525/450; 525/461; 525/534; 525/537; 525/540
[58] Field of Search ...................................... 525/437, 420, 525/425, 432, 439, 433, 444, 450, 461, 534, 537, 540

[56] References Cited

U.S. PATENT DOCUMENTS

| | | | |
|---|---|---|---|
| 4,075,173 | 2/1978 | Maruyama | 528/206 |
| 4,207,407 | 6/1980 | Helminiak et al. | 525/425 |
| 4,228,218 | 10/1980 | Takayanagi et al. | 525/58 |
| 4,408,022 | 10/1983 | Cincotta | 525/444 |
| 4,460,736 | 7/1984 | Froix | 525/437 |

FOREIGN PATENT DOCUMENTS

| | | |
|---|---|---|
| 553846 | 8/1993 | European Pat. Off. . |
| 6-145534 | 5/1994 | Japan . |
| 8800605 | 1/1988 | WIPO . |

OTHER PUBLICATIONS

Billmeyer F.W., *Textbook of Polymer Science*, 2d Ed. p. 233 Wiley–Interscience, NY (1971).

*Primary Examiner*—Patricia A. Short
*Attorney, Agent, or Firm*—Morrison & Foerster

[57] ABSTRACT

There is a provided a method to produce a polymer composite material in which the rigid polymer $(R_m)^n$ is dispersed uniformly at the molecular level in the flexible polymer (M), preferably by both polymerization with no solvent in the molten and mixed state and subsequent polymerization in the solid state. According to the preferred embodiment of the present invention, the polymer composite material is produced by polymerization with no solvent in the molten and mixed state. In the case that the rigid polymer is polymerized from the monomer having a slow polymerization rate, in order to prevent roughness of the rigid polymer during polymerization, the polymerization in the molten state is stopped at the polymerization degree equal to that of an oligomer and the resulting composite is subsequently polymerized in the solid state to increase the polymerization degree of the rigid polymer. Therefore, the rigid polymer having excellent mechanical properties can be dispersed microscopically at the molecular level in the matrix polymer to achieve the reinforcing effect at the molecular level. And a small addition of the rigid polymer can enhance an elastic modulus and a strength.

3 Claims, No Drawings

METHOD FOR PRODUCING A POLYMER COMPOSITE MATERIAL

This application is a continuation of application Ser. No. 08/528,633, filed Sep. 7, 1995, now abandoned.

BACKGROUND OF THE INVENTION

1. Field of the Invention

The present invention relates to a method for producing a polymer composite material in which the polymerization degree of a rigid polymer, dispersed in a flexible polymer and reinforcing it at the molecular level, is increased.

2. Prior Art

Unique properties are generally established in a polymer material due to its high-order structure. The high-order structure is influenced by such a primary structure as molecular weight, molecular weight distribution, crystallinity, orientation and so on, particularly depends largely on its molecular structure. Therefore, there has been macro fiber reinforced composite materials since the past so as to overcome the limit of mechanical properties, which occur naturally.

Examples of filament fibers having a high elastic modulus and a high strength used as a macro fiber reinforced composite material include carbon fibers, glass fibers, alamide fibers and so on. However, these fibers are usually aggregates of fibril and micro fibril and thus contain defects at each place which cause micro cracks. And since the diameter of the filament is about 10 $\mu$m, an interface bonding between the fiber and the matrix must be strong enough to distribute the external stress uniformly over oriented fibers in the matrix and draw out a possible ultimate property of the fiber. As for these problems of the structural defects of the macro fiber and the interface bonding, the far-reaching effects of the fatal defects can be reduced and the strength can be enhanced by minuteness of the diameter. That is, the minuteness of the diameter prevents the stress from concentrating at a local part and increase its aspect ratio UD (L and D are the length and the diameter of the reinforced fiber, respectively), thereby increasing the contact area, with the result that the problem of the interface bonding with the matrix molecule can be eliminated. Therefore, it is a best mode to disperse the rigid polymer in the matrix, which mode makes a critical aspect ratio easily achieved if the molecular diameter of the rigid polymer is D, resulting in establishment of the theoretical strength of the molecule if the interface bonding between the fiber and the matrix is enough since rupture of the composite material means rupture of the covalent bond of the molecular chain in the composite material. The rigid molecular chain structure provides the resulting crystal with a molecular chain rigidity due to its molecular structure and also a high strength in the direction of the molecular chain such as the molecular chain can not be folded. A foldable chain structure usually causes a defect at the folded part. Moreover, since a non-crystal part is a propagation path of the destruction crack due to a small number of covalent bonds, the rigid polymer can improves the strength of the composite material.

Therefore, if the molecular chain of the reinforcing polymer has a rigidity over a certain limit and can be dispersed microscopically and uniformly in the matrix polymer, it is expected that a small addition of the reinforcing polymer enhances various kinds of mechanical properties without a decline of the processability.

Hitherto, based on the above idea, concepts of the polymer composite are proposed in Japanese Patent Publication Tokkosho No. 61-5500 and International Patent Domestic Publication No. Sho 55-500440. These prior polymer composites are basically made according to the method in which one polymer and the other polymer are mixed uniformly with the solvent. At the present technical level, it is very difficult to disperse and mix those polymers very uniformly in the matrix, so that we have a problem that many resulting reinforcing materials (agglomerates of the rigid polymer) often have a diameter exceeding a few microns. Even if uniform dispersion can be achieved, the structure is usually thermally unstable and is liable to change into the phase-separation state during molding processing. That is, there are many difficulties in application in industry since the reinforcing material easily becomes rough. Further, it is disadvantageous that we can not use a polymer which is not compatible with a solvent to be used. Moreover, since the use of solvent is regulated by law from various view point at present, it is preferable to provide a non-solvent method.

Then, we provided a polymer composite material including a rigid polymer which is a rod-like reinforcing material having a cross-sectional diameter of 0.07 $\mu$m or less when cut at right angles to the longitudinal direction, produced by the method comprising a step of polymerizing the rigid polymer in the flexible polymer matrix with no solvent in the molten and mixed state and a step of dispersing the rigid polymer microscopically at the molecular level (Japanese Unexamined Patent Publication Tokkaihei No. 6-145534 corresponding to U.S. patent application Ser. No. 08/010, 710 and European Patent Application No. 93 101 400.5 (Publication No. 0 553 846 A3)).

However, the rigid polymer was found to have a tendency to become rough in the matrix polymer with the mixing and polymerization time. In order to achieve the desired reinforcement effect at the molecular level, polymerization time must be controlled such that said diameter of the dispersed particle should not exceed 0.07 $\mu$m. On the other side, some monomers of the rigid polymer do not have rapid polymerization rates in the matrix polymer, and in such a case, the mixing and polymerization for a short time may provide the rigid polymer with inadequate polymerization degrees and insufficient mechanical properties.

Then, it is an object of the present invention to provide a polymer composite material and a method for producing the same, wherein the polymerization degree of the rigid polymer is increased, thereby, the reinforcement effect at the molecular level being increased, without the roughness of the rigid polymer during polymerization in the matrix polymer.

The method was invented in view of the fact that, if the rigid polymer having a slow polymerization rate was complexed with the matrix polymer at a state of low polymerization degree similar to that of an oligomer, the rigid polymer could disperse microscopically in the matrix polymer and the polymerization degree was increased by the subsequent polymerization in a solid phase, resulting in providing a rigid polymer having excellent mechanical properties without roughness of the diameter of the dispersed particle of the rigid polymer. According to the present invention, there is provided a method for producing a polymer composite material characterized in that the polymer composite obtained by a flexible polymer (M) and a rigid oligomer or polymer $(R_m)^n$ is polymerized in the solid phase at more than the temperature at which said rigid oligomer or polymer can be polymerized and below glass-transition temperature of the rigid oligomer or polymer so as to increase the polymerization degree of said rigid oligomer or polymer $(R_m)^n$. In the present invention, the polymer composite material before the polyzation in the solid state may be produced by polymerizing the flexible polymer (M) and a monomer ($R_m$) to form the rigid polymer $(R_m)^n$ with no solvent in a molten and mixed state.

DETAILED DESCRIPTION OF THE INVENTION

According to the present invention, the rigid polymer having the polymerization degree of oligomer can be dispersed microscopically in the composite and polymerized in such a way that the resultant rigid polymer should not agglomerate during mixing and polymerization and the diameter of the dispersed particle should not become rough. Moreover, even if the polymerization degree of the rigid polymer in the polymer composite material is similar to that of an oligomer, this oligomer can be subsequently polymerized in the solid phase by heating the composite. Therefore, the rigid polymer becomes excellent mechanical properties in the matrix polymer and can be dispersed microscopically in the matrix polymer and the reinforcement effect at the molecular level can be achieved.

Particularly, when said monomer ($R_m$) to form the rigid polymer $(R_m)^n$ is selected from the groups of (a) all aromatic polyesters and their derivatives consisting of aromatic hydroxyl acids or aromatic diols and aromatic dicarboxylic acids and (b) all aromatic polyamids and their derivatives consisting of aromatic amino acids or aromatic diamines and aromatic dicarboxylic acids, the increase of polymerization degree during polymerization is very slow, therefore, the rigid polymer is considered to be dispersed and precipitate at the degree equal to that of an oligomer (about 8 polymerization degree) at the stage at which the production of the composite is finished. And according to the present invention, the polymerization degree of the rigid oligomer or polymer can be increased by said subsequent polymerization in the solid phase, with the result that the mechanical properties of the composite material can be enhanced. The polymerization degree of the oligomer or polymer $(R_m)^n$ may be decided depending on the dispersion property of the oligomer or polymer $(R_m)^n$ in the matrix polymer.

In the present invention, the polymers composing the composite material can be classified into two, that is, one is a flexible polymer (M) composing a matrix polymer and the other is a rigid polymer composing a reinforcing material. The resultant rigid polymer in the present invention means that bonding of a polymer chain is strong, the occupying cross-sectional area of the polymer chain is small, and elongation of the polymer chain is small. If any polymer fulfills this definition, it can be called a rigid polymer. To be more concrete, the rigidity can be expressed by using both a theoretical crystal elastic modulus $E_c$ and a theoretical strength $\sigma_b$ at the time of destruction (see the specifications of Japanese Unexamined Patent Publication Tokkaihei 6-145534).

From the viewpoint of the mechanical properties, based on the theoretical crystal elastic modulus and theoretical strength as information which can be obtained at present and the carry-over values of the elastic modulus in tension and tensile strength of the actual fiber, the rigid polymer will be expressed as follow.

TABLE 1

| theoretical value | carry-over value |
|---|---|
| theoretical crystal elastic modulus [GPa] 150 or more | elastic modulus in tension [GPa] 100 or more |
| theoretical strength [GPa] 2.0 or more | tensile strength [GPa] 2.0 or more |

Examples of the rigid polymer which meets the physical conditions described above may include polymers having a repeated unit structure of the following chemical formula 1.

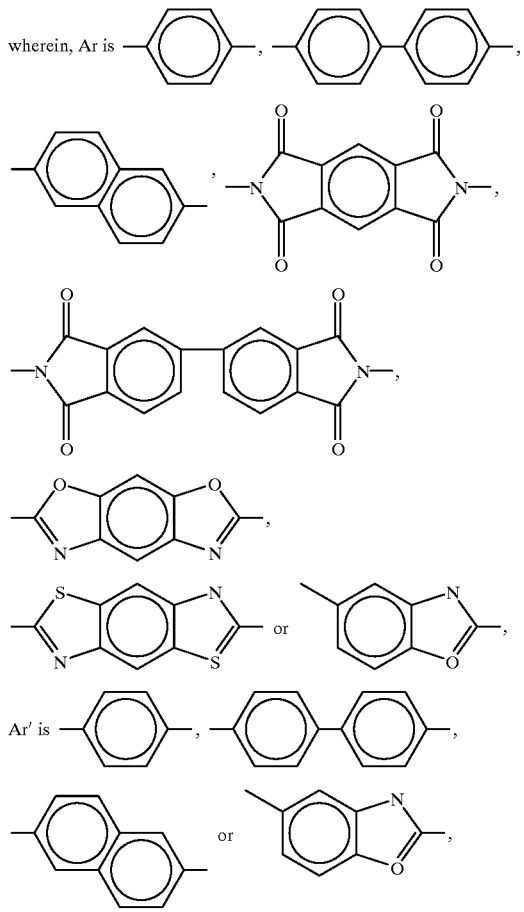

X is —CH=N—, —COO—, —N=N(O)—, —CONH—, —N=N—, —C=C— or —CH=CH—, n=0 or 1.

In which, all benzene rings may have a substituent such as an alkyl group, halogen and so on. Concrete examples of the rigid polymer represented by such a chemical formula may include poly(p-oxybenzoyl), poly(p-benzamide), poly (p-phenylene terephtalamide), polyazomethyn poly(p-phenylene pyromellitimide), polybenzobisoxazol, polybenzobisthiazol, polybenzoxazol and so on. Particularly, aromatic polyester and its derivatives are produced by polymerization of (a) aromatic hydroxy acids or aromatic diols in combination with aromatic dicarboxylic acids as a monomer. Examples of said aromatic polyesters may include polyoxybenzoyl, poly(p-phenylene terephtalate) and so on. On the other hand, aromatic polyamide and its derivatives are produced by polymerization of (b) aromatic amino acids or aromatic diamines in combination with aromatic dicarboxylic acids as a monomer. Examples of said aromatic polyamide may include poly(p-benzamide), poly(p-phenylene terephtalamide) and so on. These polymers are particularly preferable to be polymerized according to the method of the present invention.

Examples of the flexible polymer used in the present invention may include general polymers which do not belong to category of the above-mentioned rigid polymer and are used as a matrix polymer of the composite material. Examples of such a polymer may include engineering plastics and general-use plastics such as nylon 6, nylon 66 polyethersulfone, polycarbonate, polybutylene terephtalate and polyethylene telephtalate. When polyethersulfone, polysulfone, polyetherimide nylon 66, polyphenylenesulfide, polyether etherketone and polyallylate are used as a monomfer, it is particularly preferable to use the method of the invention.

The polymer composite according to the present invention comprises a rigid polymer dispersed microscopically at the molecular level and the rigid polymer preferably has a cross-sectional diameter (the diameter of the dispersed particle) of 0.07 µm or less when cut at right angles to the longitudinal direction. The cross-sectional diameter of the rod-like reinforcing material means a diameter measured when there is corrected to a corresponding circle a gathering part of the rigid polymers in the composite material (a crowded part of the rod-like rigid polymers in the matrix of the flexible polymer) and it is cut at right angles to the longitudinal direction.

In order to obtain the cross-sectional diameter of 0.07 µm or less in the rigid polymer when it is cut at right angles to the longitudinal direction, it is necessary to use the method according to the present invention. That is, a flexible polymer (M) and a monomer ($R_m$) to form a rigid polymer $(R_m)^n$ are polymerized with no solvent in the molten and mixed state and the resulting composite is subsequently polymerized in the solid state such that the cross-sectional diameter of the resulting rigid polymer before the subsequent polymerization in the solid state should be 0.07 µm, preferably 0.05 µm, or less.

And the subsequent polymerization in the solid state is necessarily to be conducted at the temperature at which the rigid oligomer or polymer produced by said mixing and polymerization can be polymerized in the solid-state or above it and below glass-transition temperature of the rigid polymer before subsequent polymerization. The polymerization degree of said rigid oligomer or polymer $(R_m)^n$ is increased by the polymerization in the solid state. However, if the rigid polymer is at its glass-transition temperature and above it, the rigid polymer disappears due to melting or becomes rough due to phase separation during polymerization. This polymerization in the solid state is usually proceeded by heat treatment at 150–300° C. under high vacuum or. in inert gas such as $N_2$ flow, for example, in a vacuum surface or autoclave.

In order to polymerize the flexible polymer and the monomer to form the rigid polymer with no solvent in the molten and mixed state, to be concrete, the flexible polymer and the monomer to form the rigid polymer may be molten and mixed in a biaxial extruder and the like. For example, in case of p-acetoxybenzoic acid, the polymerization is proceeded by raising the temperature up to 250–300° C. and more. Needless to say, the above process can be carried out without the use of an extruder, if with no solvent.

Polymerization may be carried out under the predetermined shear force. To be concrete, the shear force can be expressed by shear flow, particularly rate of shear. In the case that the flexible polymer is used as a matrix polymer, the rate of shear of 2.0–25 sec$^{-1}$, preferably 2.0–15 sec$^{-1}$ is usually suitable during polymerization. The rate of shear is the maximum apparent rate of shear calculated from the following equations (1) and (2) in which Newton-viscous substance is assumed on the basis of the rotational frequency measured with the rotor-type miniature kneader (Koneruder-EK-3-5c Tousoku precision industry K.K.).

$$\sigma = 2\pi\omega/G$$

$$V = \pi r^2/G$$

($\sigma$=rate of shear, r=radius, $\omega$=angular velocity, V=volume, G=height of the container for mixing and melting; all of them are shown in FIG. 2.) It is particularly required to give a shear force in order to disperse the rigid polymer microscopically at the molecular level. The diameter and axial ratio of the rigid polymer (reinforcing phase) can be controlled due to the adjustment of the above shear force, with the result that mechanical properties which depend on the micro structure, particularly high tensile strength and high rigidity, can be obtained.

Regarding the mix proportion, for example, in the case that the flexible polymer is polyethersulfone, the monomer is p-acetoxybenzoic acid, 3–20 parts by weight, preferably 5–15 parts by weight, of the monomer is added to 100 parts by weight of the flexible polymer. If the ratio of the monomer is above 20 parts by weight, the cross-sectional diameter of the rigid polymer when cut at right angles to the longitudinal direction exceeds 0.07 µm and the object of the present invention to obtain a toughness can not be achieved. If below 3 parts by weight, the effect of the presence of the rigid polymer cannot be obtained.

The additive, polymerization initiator and the like may be blended at the time of melting and mixing of the present invention.

According to the present invention, the polymer composite material is produced by polymerization with no solvent in the molten and mixed state. In the case that the rigid polymer is polymerized from the monomer having a slow polymerization rate, in order to prevent roughness of the rigid polymer during polymerization, the polymerization in the molten state is stopped at the polymerization degree similar to that of an oligomer and the resulting composite is subsequently polymerized in the solid state to increase the polymerization degree of the rigid polymer. Therefore, the rigid polymer having excellent mechanical properties can be dispersed microscopically at the molecular level in the matrix polymer to achieve the reinforcing effect at the molecular level. And a small addition of the rigid polymer can enhance an elastic modulus and a strength.

The present invention will become apparent from the following description of embodiments. The embodiments are not intended as a definition of the limits of the invention.

EXAMPLE 1

1.26 g of polyether sulfone as a flexible polymer and 0.149 of p-acetoxybenzoic acid as a monomer to form the rigid polymer (weight ratio; 90/10) were kneaded at 240° C. for 4 minutes in the miniature Injection molding machine (MINI-MAX MOLDER CS-183MMX, Custom Scientific Instruments. INC) and were blended uniformly. The result ing blend was polymerized in the molten and mixed state at 300° C. for 10 minutes in said miniature injection molding machine to give a polyether sulfone/polyoxy benzoyl (90/10) composite. Its glass transition temperature was 325° C. (Comparative Example 1).

The resulting composite was heated at 210° C. for 12 hours under high vacuum (760 mmHg and more) to give a composite material of the Invention (Example 1).

The composite material was injected and molded from this miniature injection molding machine into the test piece mold to give samples for a tensile test. The samples were tested.

The conditions for the injection and molding was that the resin temperature was 310° C. and the temperature of the mold was 140° C.

EXAMPLE 2

1.26 g of polyether sulfone as a flexible polymer and 0.14 g of p-acetaminobenzoic acid as a monomer to form the rigid polymer (weight ratio; 90/10) were kneaded at 270° C. for 4 minutes in the miniature injection molding machine (MINI-MAX MOLDER CS-183MMX, Custom Scientific Instruments. INC) and were blended uniformly. The resulting blend was polymerized in the molten and mixed state at 300° C. for 10 minutes in said miniature injection molding machine to give a polyether suifonelpoly-p-benzamide (90/10) composite. Its glass transition temperature was 332° C. (Comparative Example 2).

The resulting composite was heated at 210° C. for 12 hours under high vacuum (760 mmHg and more) to give a composite material of the invention (Example 2).

The composite material was injected and molded from this miniature injection molding machine into the test piece mold to give samples for a tensile test. The samples were tested.

The conditions for the injection and molding was that the resin temperature was 310° C. and the temperature of the mold was 140 ° C.

EXAMPLE 3

1.26 g of poly sulfone as a flexible polymer and 0.14 g of p-acetoaminobenzoic acid as a monomer to form the rigid polymer (weight ratio; 90/10) were kneaded at 240° C. for 4 minutes in the miniature injection molding machine (MINI-MAX MOLDER CS-183MMX, Custom Scientific Instruments. INC) and were blended uniformly. The resulting blend was polymerized in the molten and mixed state at 300° C. for 10 minutes in said miniature injection molding. machine to give a polyether sulfone/poly-p-benzamide (90/10) composite. Its glass transition temperature was 332° C. (Comparative Example 3).

The resulting composite was heated at 210° C. for 12 hours under high vacuum (760 mmHg and more) to give a composite material of the invention (Example 3).

The composite material was injected and molded from this miniature injection molding machine into the test piece mold to give samples for a tensile test. The samples were tested.

The conditions for the injection and molding was that the resin temperature was 300° C. and the temperature of the mold was 140 ° C.

The resulting samples for tensile test as described above were subjected to the tensile test according to the following way.

Tensile tester (MINI-MAX TENSILE TESTER CS-183TE, custom Scientific Instruments. INC)

Tensile rate: 0.566 cm/min

Strain rate: 0.629/min

Distance between standard lines of the test sample: L=0.899 cm

Cross-sectional area of the test piece: $(0.1587/2)^2 \times \pi$

Measuring temperature: 22 ° C.

The results are shown in Table 2.

TABLE 2

|  | tensile strength [MPa] |
|---|---|
| Comparative Example 1 | 144 |
| Example 1 | 171 |
| Comparative Example 2 | 122 |
| Example 2 | 152 |
| Comparative Example 3 | 112 |
| Example 3 | 130 |

What is claimed:

1. A method for producing a second solid polymer composite material containing no solvent from a first solid polymer composite material, comprising:

(a) providing said first solid polymer composite material comprising a flexible polymer and a rigid oligomer or polymer polymerized in a molten and mixed state in the presence of the flexible polymer with no solvent; and (b) polymerizing said first solid polymer composite material at a temperature greater than a temperature at which said rigid oligomer or polymer can be polymerized and below the glass transition temperature of the rigid oligomer or polymer so as to increase the tensile strength of said first solid polymer composite to form said second solid polymer composite material;

wherein the rigid oligomer or polymer forms a rod-like reinforcing material having a cross-sectional diameter of 0.07 μm or less.

2. A method for producing a second solid polymer composite material according to claim 1, wherein the monomer is selected from the group consisting of aromatic hydroxyl acids, aromatic diols, aromatic dicarboxylic acids, aromatic amino acids, aromatic diamines and aromatic dicarboxylic acids.

3. A method for producing a second solid polymer composite material from a first solid composite material, comprising:

(a) polymerizing a monomer to form a rigid oligomer or polymer with no solvent and in the presence of a flexible polymer at a temperature greater than a temperature at which said rigid oligomer or polymer can be polymerized and above the glass transition temperature of said flexible polymer in a mixed state to form said first solid polymer composite material; and (b) polymerizing said first solid polymer composite material at a temperature greater than the temperature at which said rigid oligomer or polymer can be polymerized and below the glass transition temperature of both said rigid oligomer or polymer and said flexible polymer to form said second solid polymer composite material, wherein the rigid oligomer or polymer forms a rod-like reinforcing material having a cross-sectional diameter of 0.07 μm or less.

\* \* \* \* \*